United States Patent
Norris et al.

(10) Patent No.: US 10,273,861 B2
(45) Date of Patent: Apr. 30, 2019

(54) MULTI-LEG EXHAUST AFTERTREATMENT SYSTEM AND METHOD

(71) Applicant: CUMMINS INTELLECTUAL PROPERTY, INC., Columbus, IN (US)

(72) Inventors: Colin L. Norris, Columbus, IN (US); Richard J. Ancimer, Toronto (CA); Axel O. zur Loye, Columbus, IN (US); Randy W. Nelson, Columbus, IN (US); Gary Charles Salemme, Columbus, IN (US); Ousmane Gueye, Greenwood, IN (US); John Franklin Wright, Columbus, IN (US)

(73) Assignee: Cummins Intellectual Property, Inc., Minneapolis, MN (US)

(*) Notice: Subject to any disclaimer, the term of this patent is extended or adjusted under 35 U.S.C. 154(b) by 0 days.

(21) Appl. No.: 15/981,485

(22) Filed: May 16, 2018

(65) Prior Publication Data
US 2018/0258823 A1    Sep. 13, 2018

Related U.S. Application Data

(62) Division of application No. 14/838,910, filed on Aug. 28, 2015, now Pat. No. 10,001,047, which is a
(Continued)

(51) Int. Cl.
*F01N 13/00* (2010.01)
*F01N 3/20* (2006.01)
(Continued)

(52) U.S. Cl.
CPC .......... *F01N 13/011* (2014.06); *F01N 3/2066* (2013.01); *F01N 9/00* (2013.01);
(Continued)

(58) Field of Classification Search
None
See application file for complete search history.

(56) References Cited

U.S. PATENT DOCUMENTS

| 2,805,544 A | 9/1957 | Wells |
| 4,427,418 A * | 1/1984 | Kogiso ................... F01N 3/027 422/178 |

(Continued)

FOREIGN PATENT DOCUMENTS

| JP | 2013142367 A | 7/2013 |
| WO | WO-2006/095918 | 9/2006 |

OTHER PUBLICATIONS

The International Search Report and Written Opinion of the International Searching Authority issued in PCT/US2011/055931, dated Mar. 5, 2012.
(Continued)

*Primary Examiner* — Patrick D Maines
(74) *Attorney, Agent, or Firm* — Foley & Lardner LLP

(57) ABSTRACT

An exhaust aftertreatment system for treating exhaust flow from an internal combustion engine, and associated method, allows for independent control of exhaust flow through plural exhaust legs of the exhaust aftertreatment system. The independent control of exhaust flow is carried out by adjusting a valve positioned in each the exhaust legs based on a value of a signal generated by a flow measurement device positioned along at least one of the exhaust legs. The valves can be adjusted to force a target flow in a exhaust leg, relative flow among exhaust legs, exhaust temperature in an exhaust leg, exhaust backpressure and/or imbalance within the exhaust legs.

8 Claims, 4 Drawing Sheets

Related U.S. Application Data division of application No. 13/271,626, filed on Oct. 12, 2011, now Pat. No. 9,151,202.

(60) Provisional application No. 61/392,701, filed on Oct. 13, 2010.

(51) Int. Cl.
  *F01N 9/00* (2006.01)
  *F01N 13/08* (2010.01)

(52) U.S. Cl.
  CPC ............ *F01N 13/087* (2013.01); *Y02T 10/24* (2013.01); *Y02T 10/47* (2013.01)

(56) References Cited

U.S. PATENT DOCUMENTS

| | | | |
|---|---|---|---|
| 5,203,166 A * | 4/1993 | Miller | F01N 3/021 55/466 |
| 5,946,221 A | 8/1999 | Fish et al. | |
| 7,260,927 B2 | 8/2007 | Hsu | |
| 7,334,400 B2 | 2/2008 | Yan et al. | |
| 7,377,101 B2 | 5/2008 | Mital et al. | |
| 7,665,297 B2 | 2/2010 | Suzuki | |
| 7,743,608 B2 | 6/2010 | Ogiso | |
| 7,984,608 B2 | 7/2011 | Roozenboom | |
| 2003/0061802 A1 | 4/2003 | Nakatani | |
| 2003/0066287 A1 | 4/2003 | Hirota et al. | |
| 2006/0053776 A1 | 3/2006 | Ancimer | |
| 2006/0137329 A1 * | 6/2006 | Lowe | F01N 3/031 60/286 |
| 2007/0137186 A1 * | 6/2007 | Igarashi | F01N 3/0222 60/297 |
| 2008/0102010 A1 | 5/2008 | Bruck et al. | |
| 2008/0141663 A1 | 6/2008 | Ono | |
| 2009/0038303 A1 | 2/2009 | Takeuchi et al. | |
| 2009/0308052 A1 | 12/2009 | Zhang et al. | |
| 2010/0146945 A1 | 6/2010 | Niimi et al. | |
| 2010/0319331 A1 * | 12/2010 | Wagner | F01N 3/0238 60/311 |

OTHER PUBLICATIONS

Machine English translation of abstract for JP-2013142367A.

* cited by examiner

MULTI-LEG EXHAUST AFTERTREATMENT SYSTEM AND METHOD

CROSS REFERENCE TO RELATED APPLICATIONS

The present application is a divisional of U.S. patent application Ser. No. 14/838,910, filed Aug. 28, 2015, which is a divisional of U.S. patent application Ser. No. 13/271,626, filed Oct. 12, 2011, now U.S. Pat. No. 9,151,202, which claims the benefit of priority to U.S. Provisional Application No. 61/392,701, filed Oct. 13, 2010 and the contents of which are incorporated herein by reference in their entirety.

TECHNICAL FIELD

The inventions relate to aftertreatment systems and methods for internal combustion engines and, more particularly, to systems and methods in which exhaust flow is measured and controlled through multiple exhaust legs of an exhaust after-treatment system.

BACKGROUND

Nitrogen oxides (NOx), which include nitric oxide (NO) and nitrogen dioxide ($NO_2$), are formed during the high temperature and pressure combustion of an air and fuel mixture in an internal combustion engine. These oxides cause a number of concerns related to the environment, such as a source of ground-level ozone or smog, acid rain, excess aqueous nutrients, and can readily react with common organic chemicals, and even ozone, to form a wide variety of toxic products. Since the 1970's, government legislation has required increasing reductions of NOx in exhaust gas emissions.

To comply with increasingly stringent government mandates, industry has developed several NOx reduction technologies to treat post combustion exhaust, of which diesel oxidation catalyst (DOC) and selective catalytic reduction/reducer (SCR) technologies are actively pursued.

In addition to NOx reduction, governments have been imposing progressive mandates for reducing amounts of particulate matter (PM) in exhaust emissions. The diesel particulate matter filter (DPF) has been developed for exhaust aftertreatment systems to remove diesel particulate matter containing soot, unburned fuel, lubrication oil etc. from the exhaust gas.

A DPF typically includes a filter encased in a canister that is positioned in the diesel exhaust stream. The filter is designed to collect PM while allowing exhaust gases to pass through it. Types of DPFs include ceramic and silicon carbide materials, fiber wound cartridges, knitted fiber silica coils, wire mesh and sintered metals. DPFs have demonstrated reductions in PM by up to 90% or more and can be used together with a DOC to reduce HC, CO, and soluble organic fraction (SOF) PM in diesel exhaust.

SUMMARY

The inventions are directed to exhaust aftertreatment systems and a method of exhaust aftertreatment that allow for independent control of exhaust flow through each of plural exhaust legs in the exhaust aftertreatment system. At least one of the exhaust legs includes a flow measurement device configured to sense a characteristic of the exhaust flow in that leg, from which amounts of exhaust flow in each of the plural exhaust legs can be independently controlled based on the sensed flow characteristic. The exhaust valves can be adjusted to force a target amount of exhaust gas flowing in an exhaust leg, a target temperature of exhaust gas flowing in an exhaust leg, to increase exhaust backpressure, and/or to force a balance or imbalance of exhaust flow among the plural exhaust legs.

In accordance with an embodiment consistent with the claimed invention, an exhaust aftertreatment system for treating exhaust flow from an internal combustion engine includes a first exhaust leg positioned to receive the exhaust flow from the engine, a first selective catalytic reducer (SCR), a first reductant dosing system including a doser upstream of the first SCR and configured to inject reductant into an exhaust stream in the first exhaust leg, and a first exhaust flow control valve positioned along said first exhaust leg. A second exhaust leg of the exhaust aftertreatment system is positioned to receive the exhaust flow from the engine in parallel to the exhaust flow in the first exhaust leg. The second exhaust leg includes a second SCR, a second reductant dosing system including a doser upstream of the second SCR and configured to inject reductant into an exhaust stream in the second exhaust leg, and a second exhaust flow control valve positioned along the second exhaust leg. The aftertreatment system includes a flow measurement sensor device positioned along at least one of the first and second exhaust legs and configured to generate a signal indicative of a characteristic of exhaust mass flow or exhaust volume flow of the exhaust steam in that leg. A control module is configured to independently control the first and second exhaust valves based on the signal indicative of exhaust mass flow or exhaust volume flow.

In accordance with another embodiment consistent with the claimed invention, a method of exhaust aftertreatment is provided for an exhaust aftertreatment system of an internal combustion engine. The exhaust aftertreatment system includes plural exhaust legs in parallel with one another, and each of the exhaust legs includes a selective catalytic reducer (SCR) and a controllable exhaust valve. The method includes flowing exhaust gas through the plural exhaust legs, detecting an exhaust gas flow characteristic in at least one of the plural exhaust legs, determining amounts of the exhaust gas flow in the plural exhaust legs based on said detected exhaust gas flow characteristic, and individually adjusting the exhaust valves in the plural exhaust legs based on the determined amounts of exhaust gas flow.

In yet another embodiment consistent with the claimed invention, a multi-leg exhaust aftertreatment system includes plural parallel exhaust legs adapted to receive exhaust from an internal combustion engine. Each of the exhaust legs includes a diesel oxidation catalyst (DOC), a diesel particulate filter (DPF) and an independently controllable exhaust valve. An exhaust flow sensor is positioned along at least one of the plural exhaust legs and is configured to sense an amount of exhaust flowing in that exhaust leg and generate a exhaust flow signal indicative of said amount. An exhaust valve control module is connected to the exhaust flow sensor to receive the exhaust flow signal and generate control signals for each of the independently controllable exhaust valves based on the exhaust flow signal.

The various aspects are described hereafter in greater detail in connection with a number of exemplary embodiments to facilitate an understanding of the invention. However, the invention should not be construed as being limited to these embodiments. Rather, these embodiments are provided so that the disclosure will be thorough and complete, and will fully convey the scope of the invention to those skilled in the art.

DETAILED DESCRIPTION

The inventors have recognized that exhaust flow in individual legs of a multi-leg exhaust aftertreatment system can be known and controlled to provide a balanced state of flow among the exhaust legs or to force an imbalanced state of flow through the exhaust legs. To determine the state of exhaust flow in the exhaust legs in the multi-leg exhaust aftertreatment system, at least one exhaust leg includes a mass flow or volume flow measurement device that provides a measurement of a characteristic of exhaust flow, in real time, through that exhaust leg. The measured characteristic can be a direct measurement of the exhaust flow or another characteristic from which the mass flow or volume flow can be calculated for that exhaust leg and/or the relative exhaust flow between the legs can be determined. Control or compensation remedies can be applied according to the determined state of exhaust flow and other operating parameters.

Figure 1:
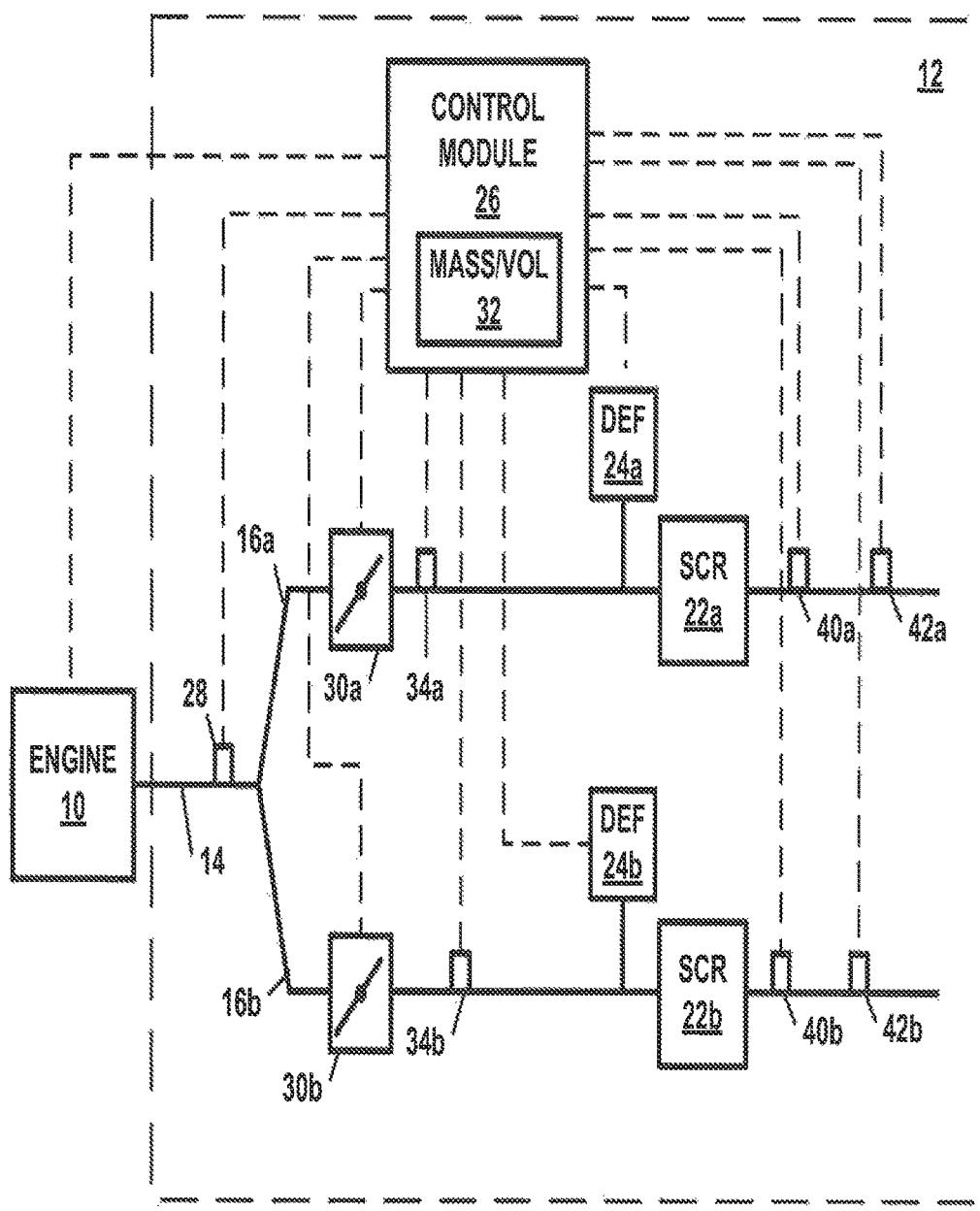
FIG. 1 is a schematic block diagram of a multi-leg after-treatment system according to an exemplary embodiment in which each exhaust leg includes an exhaust flow control valve and an SCR.

FIG. 1 is a block diagram showing an internal combustion engine 10 fluidly connected with an exhaust aftertreatment system 12. The exhaust aftertreatment system 12 includes a main exhaust passage 14 and at least two exhaust legs or passages 16a and 16b splitting off from the main exhaust passage 14. The main exhaust passage 14 and exhaust legs 16a, 16b can be connected downstream of a common exhaust manifold (not shown) attached to the engine 10. Also, engine 10 may include one or more turbochargers (not shown). Each of the exhaust legs 16a, 16b includes an SCR, a reductant dosing system and valve. Additionally, the exhaust aftertreatment system 12 includes a control module 26, which can be, for example, an electronic control unit (ECU) or electronic control module (ECM) that monitors the performance of the engine 10 and other elements of the exhaust aftertreatment system 12. More specifically, FIG. 1 shows exhaust leg 16a including an SCR 22a, a diesel emissions fluid (DEF) reductant dosing system 24a, and an exhaust valve 30a. Similarly, the exhaust leg 16b includes an SCR 22b, a DEF reductant dosing system 24b, and an exhaust valve 30b. Each exhaust leg 16a and 16b also can have multiple temperature and pressure sensors (not shown), which could be placed ahead and behind each element in the exhaust leg to monitor temperature and pressure at various points along the legs 16a and 16b.

Each of the DEF dosing system 24a and 24b can include a doser, a decomposition reactor, and a mixer (not shown) to deliver a metered amount of a reductant into the exhaust stream (flow) upstream the SCR device in each leg. The reductant can be an $NH_3$ source, such as anhydrous $NH_3$, aqueous $NH_3$, or a precursor that is convertible to $NH_3$ such as urea ammonia or urea, which is stored in dosing treatment supply (not shown). In the SCR process, the reductant in the exhaust stream is absorbed onto the SCR catalyst where it is used to convert NOx emissions in the exhaust gas flow into nitrogen and water, and in the case of urea, also into carbon dioxide. The predetermined amount of reductant to be injected into one leg of the exhaust aftertreatment system 12 may be delivered in a particular rate shape, such as disclosed in U.S. Pat. No. 7,587,890, the entire contents of which is hereby incorporated by reference.

The control module 26 can be a single control unit or plural control units that collectively perform the monitoring and control functions of the exhaust aftertreatment system 12. The control module 26 utilizes sensors to determine whether the exhaust aftertreatment system 12 is functioning properly. The control module 26 generates control signals based on information provided by sensors described herein and perhaps other information, for example, stored in a database or memory integral to or separate from the control module 26. The signal paths between the control module 26, the sensors and other devices are depicted in FIG. 1 using dashed lines. It is to be understood that these dashed signal paths can be representative of either hard wired or wireless communication paths.

The control module 26 can include a processor and modules in the form of software programs or routines executable by the processor of the control module 26. These modules can be stored on tangible computer readable media such as memory positioned local to the control module 26 or located remote from, but accessible by the control module 26. In alternative embodiments, modules of control module 26 can include electronic circuits for performing some or all or part of the processing, including analog and/or digital circuitry. The modules can comprise a combination of software, electronic circuits and microprocessor based components. The control module 26 can receive data indicative of engine performance and exhaust gas composition including, but not limited to engine position sensor data, speed sensor data, exhaust mass flow sensor data, fuel rate data, pressure sensor data, temperature sensor data from locations throughout the engine 10 and the exhaust aftertreatment system 12, requested speed or torque, NOx sensor data, and other data. The control module 26 can then generate control signals and output these signals to control various components in the engine 10 and system 12. For example, as shown in FIG. 1, the control module 26 can be connected to each of the DEF dosing systems 24a, 24b to control an injecting device such as an atomizer (not shown) to inject a reductant into the exhaust stream in a respective leg 16a, 16b upstream of the respective SCR devices 22a, 22b. For example, the controller 26 can control a timing and amount of reductant injected into the exhaust stream by each DEF dosing system 24a, 24b.

The control module 26 receives NOx sensor data by way of a NOx sensor 28 provided in the main exhaust passage 14 upstream of the point where the main exhaust splits into legs 16a, 16b, to sense the NOx concentration in the main exhaust and generate a signal indicative of the engine-out NOx concentration, although other ways to determine engine-out NOx concentration can be used, such as by using a virtual NOx sensor.

As shown in FIG. 1, the exhaust valve devices 30a, 30b are provided in respective exhaust legs 16a, 16b of the exhaust aftertreatment system 12. Each exhaust valve 30a, 30b is controllable, such as an exhaust throttle that is adjustable via an actuator controlled by control module 26, and can be provided at a position in a leg after the point where the main exhaust passage 14 splits into the plural exhaust legs, although the exhaust valves 30a, 30b can be provided at any point along a respective exhaust leg. Each exhaust valve device can be adjusted individually and independently from any other exhaust valve in the exhaust aftertreatment system 12 such that the exhaust legs 16a, 16b can assume any position from fully open, fully closed, and any partially open state. Thus, the exhaust valves 30a, 30b can be individually controlled to allow a particular amount of exhaust flow through the respective exhaust legs and control exhaust backpressure to the engine 10 for general thermal management. The valve devices 30a, 30b also allow the exhaust stream flow from the main exhaust passage 14 to be split unevenly between the between the two exhaust legs 16a, 16b. Further, the relative exhaust mass flow or volume flow among the exhaust legs 16a, 16b can be measured, and the valve devices 30a, 30b can be controlled to correct for a flow imbalance or to force an amount of exhaust flow in a leg or relative flow among plural legs to a predetermined target value or ratio.

FIG. 1 shows exhaust gas flow measurement devices 34a and 34b for determining exhaust mass flow or volume flow in positions of respective exhaust legs 16a and 16b downstream respective exhaust valve devices 30a and 30b. However, it is to be understood that the flow measurement devices 34a and 34b can be positioned anywhere along a respective exhaust leg 16a and 16b. The exhaust gas flow measurement devices 34a, 34b sense a mass or volume flow characteristic, such as pressure, from which mass flow in a leg can be determined. The flow measurement devices 34a, 34b can be delta-P based devices, hot-film type devices, vortex shedding type devices, ultrasonic type devices, or any other type of flow measurement device. Further, it is to be noted that while FIG. 1 depicts the exhaust gas mass or volume flow measurement devices 34a, 34b positioned in each of respective legs 16a, 16b, only one of the two exhaust legs need be equipped with a flow measurement device because the remaining flow values can be computed or derived from other available operating information. For example, if an amount of exhaust flow through one exhaust leg is known, the exhaust mass or volume flow through the remaining leg can be computed in a straightforward manner when the total mass or volume measurement for the entire engine is known. One method is to measure the pressure difference across one or both SCR 22a, 22b since the effective flow area of the SCR is expected to be constant over time and have relatively minimal part-to-part variation.

Referring again to FIG. 1, the control module 26 includes a mass flow or volume flow MASS/VOL module 32, which receives signals indicative of a flow characteristic from the flow measurement devices 34a, 34b and determines the exhaust gas flow (mass flow or volume flow) in each respective exhaust leg 16a, 16b.

In other exemplary embodiments, the exhaust gas flow (mass flow or volume flow) amounts can be determined in other ways. For example, by measuring the ammonia concentration downstream of the DEF dosing systems 24a, 24b, the MASS/VOL module 32 can determine exhaust flow in each exhaust leg 16a, 16b from the total mass flow rate of the reductant (DEF) and the measured concentration. For instance, by injecting the same amount of reductant (DEF) into both exhaust legs 16a, 16b, the relative split between each exhaust leg can be determined by monitoring the relative concentrations of $NH_3$ in each exhaust path. This is considered an open loop system because no adjustment would be made to the DEF to compensate for the flow imbalance. If $NH_3$ concentration is measure before the SCRs 22a and 22b, the $NH_3$ concentrations are higher and unaffected by the SCRs. This can provide a more direct measure because it removes sensitivity to SCR catalyst performance. However, higher $NH_3$ concentrations can lead to potential sampling issues due to deposit formation and obtaining an accurate measurement of $NH_3$ can be difficult (e.g., sampling across the area of the exhaust pipe).

In another exemplary embodiment, exhaust gas flow amounts can be determined by measuring the ammonia concentration downstream of each of the SCRs 22a and 22b, or inside each of the SCRs, and then using the MASSNOL module 32 to calculate relative amounts of exhaust flow in the two exhaust legs 16a and 16b. The MASSNOL module 32 also can calculate the actual flow amount in each of the exhaust legs 16a and 16b knowing the DEF (reductant) flow rate for the each exhaust leg and the total mass flow rate through the engine 10 (e.g., from a speed density calculation or from an air mass flow measurement in the intake system). The measured ammonia concentration can be used as a feedback parameter to control each of the DEF dosing systems 24a and 24b. In this way, the amount of DEF being injected into each of the exhaust legs 16a and 16b can be adjusted independently based on a close loop control feedback from the ammonia sensor, which is more robust compared with a flow split from an SCR point of view. If such feedback control is used, the outlet $NH_3$ concentration ends up being the same for both legs. This can be achieved by adjusting the commanded DEF flow. The relative flow between the legs can be estimated based on the difference in commanded DEF flow. If the commanded flows are the same, then the flow is balanced. If one leg is commanding higher DEF, then the mass flow through that leg is higher. There are assumptions built into this method, which include that the DEF dosers accurately deliver a commanded DEF quantity, the $NH_3$ concentration is measured accurately, the NOx distribution is homogeneous, and that other components is the system are behaving similarly. If feedback control is not used, then the concentrations can be used directly to calculate the exhaust gas flow amounts.

In another exemplary embodiment, the MASSNOL module 32 can calculate the flow in each leg 16a, 16b, as follows: the air flow through the engine 10 is known from a speed-density calculation and fuel flow (e.g., from a calculation performed by the ECM); from these parameters, the total air flow through the exhaust aftertreatment system 12 can be determined; and by measuring the imbalance (e.g., a 40/60 split), the exhaust flow or volume in each leg 16a, 16b can be calculated. One exemplary way to measure the imbalance in the exhaust flow through the exhaust legs is to measure the pressure difference between the two legs 16a, 16b in different locations in the aftertreatment system. For example, measuring a difference in pressure between the inlets of each SCR 22a, 22b of the respective exhaust legs 16a, 16b can provide a good indication of the exhaust flow imbalance because the inlet and the outlet pressures for the two complete aftertreatment subsystems (i.e., complete exhaust legs 16a, 16b) are the same. An algorithm utilized by the MASS/VOL module 32 in this example can access a table (e.g., a lookup table pre-stored in memory) that was created through empirical or analytical testing/analysis to calculate the relative flow split based on this delta-p measurement, the known total flow through the system, the inlet pressure and temperature, and other pressure and temperature measurements in the system. The algorithm also can calculate the flow split using equations based on principles of physics. After the exhaust flow imbalance is calculated, this information can be used in many different ways. For example, the control module 26 can compensate the reductant dosing in each leg 16a, 16b to provide a correct amount of reductant.

In the exemplary embodiment shown in FIG. 1, a NOx feedback sensor 40a and a temperature sensor 42a are positioned downstream of the exits of the SCR catalyst 22a, and a NOx feedback sensor 40b and a temperature sensor 42b are positioned downstream of the exits of the respective SCR catalyst 22b. While not shown in FIG. 1, each exhaust leg 16a, 16b can include a reductant sensor (e.g., an $NH_3$ sensor) provided downstream of respective SCR catalysts 22a, 22b as an alternative to, or in addition to a NOx feedback sensors 40a, 40b.

Accordingly, determining the exhaust flow and individually controlling the exhaust flow in exhaust legs 16a, 16b via an exhaust throttle can improve the performance of an SCR system. The addition of temperature control in a plural exhaust leg system makes it possible to raise the temperature of the SCR system at light loads, which will result in improved conversion efficiencies and lower system-out NOx. This is particularly beneficial in applications where the engine spends a lot of time at light load. For example, by completely closing an exhaust valve in one exhaust leg of an aftertreatment system, the percent heat loss through an open exhaust leg would be reduced because of reduced cross sectional area. DEF delivery in an aftertreatment system could also be more accurate. SCR performance can be improved by forcing exhaust flow entirely, or substantially entirely through one leg because the catalysts in the leg with the flow would be at a higher average temperature than if flow went through two legs due to reduced fraction of heat loss to the catalysts (the surface area for heat loss is cut approx. in half). The flow through the other leg would be zero or substantially zero (close to zero). The exhaust leg without flow would cool down slowly because there would be no internal flow to take away the heat. However, under extended operation at light load, the exhaust leg having no, or substantially no exhaust flow would eventually cool down. To address this scenario, a scheme according to an embodiment can switch exhaust flow periodically between the exhaust legs to keep the entire system warm so that when load is applied, both legs are thermally ready to perform efficiently. It also would be possible, if required, to partly close an exhaust valve in an open exhaust leg with the idea of increasing the work that the engine has to do, which would further increase the exhaust temperature. During high load operation the flow through the system will be relatively equally split between the two legs, minimizing exhaust backpressure, and allowing the engine to deliver rated power while reducing the temperature in the SCR system. (At high loads the high exhaust temperatures typically results in SCR catalyst temperatures which are higher than optimum).

Thermal control by way of independent adjustment of exhaust valves also can manage condensed hydrocarbon/water present or accumulating in the SCR catalysts (150 C for water, 220 C for hydrocarbon). SCR performance would likely improve at the same time. Additionally, embodiments can address uncertainties in the exhaust flow rates that can result in errors in the ammonia-to-NOx ratio (ANR), which negatively affect the SCR conversion efficiency or increase ammonia slip.

Figure 2:
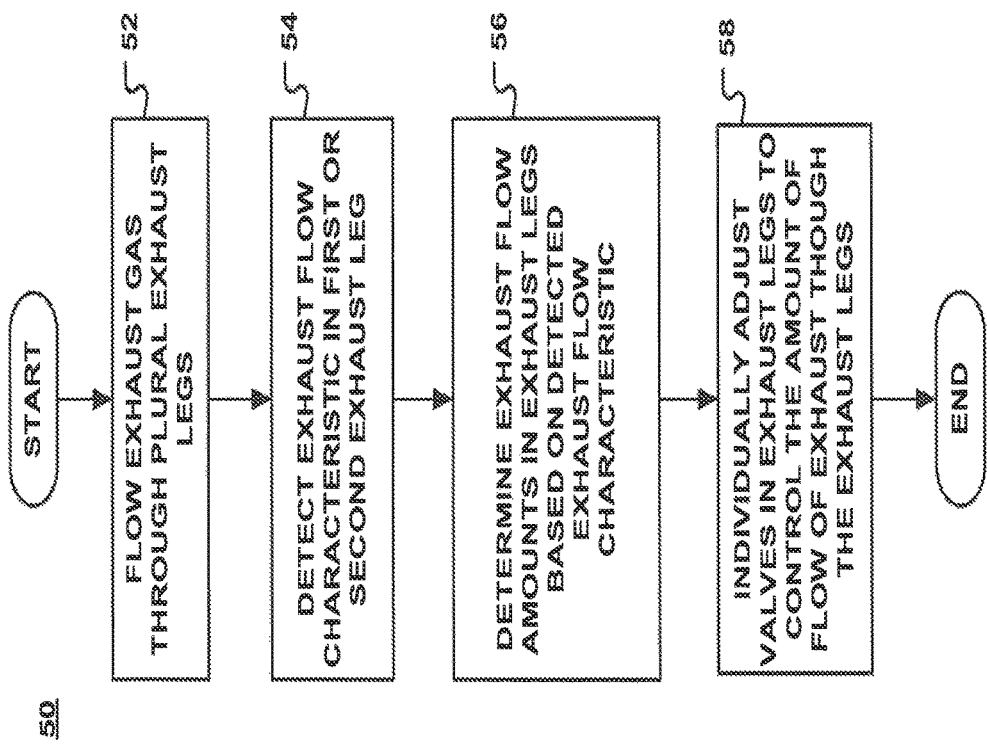
FIG. 2 is a flowchart of a process according to an exemplary embodiment.

FIG. 2 shows an exemplary process flow 50 for individually controlling exhaust flow from an engine through legs in a multi-leg exhaust aftertreatment system, such as exhaust aftertreatment system 12, including individually controllable valves in each of the exhaust legs. While the process shown in FIG. 2 is described with respect to an exhaust system including two exhaust legs, it is to be understood that similar process can be applied to an aftertreatment system having more than two exhaust legs.

Process flow 50 starts at process 52, exhaust gas from an internal combustion engine is flown though a first exhaust leg and a second exhaust leg. Next, process 54 detects an exhaust mass flow or volume flow characteristic in the first or second leg. In process 56, the exhaust flow in each leg is determined using the detected flow characteristic, and/or the relative flow between the exhaust legs is determined. In process 58, the valves in the exhaust legs are individually controlled to control an amount of exhaust through each of the exhaust legs.

Figure 3:
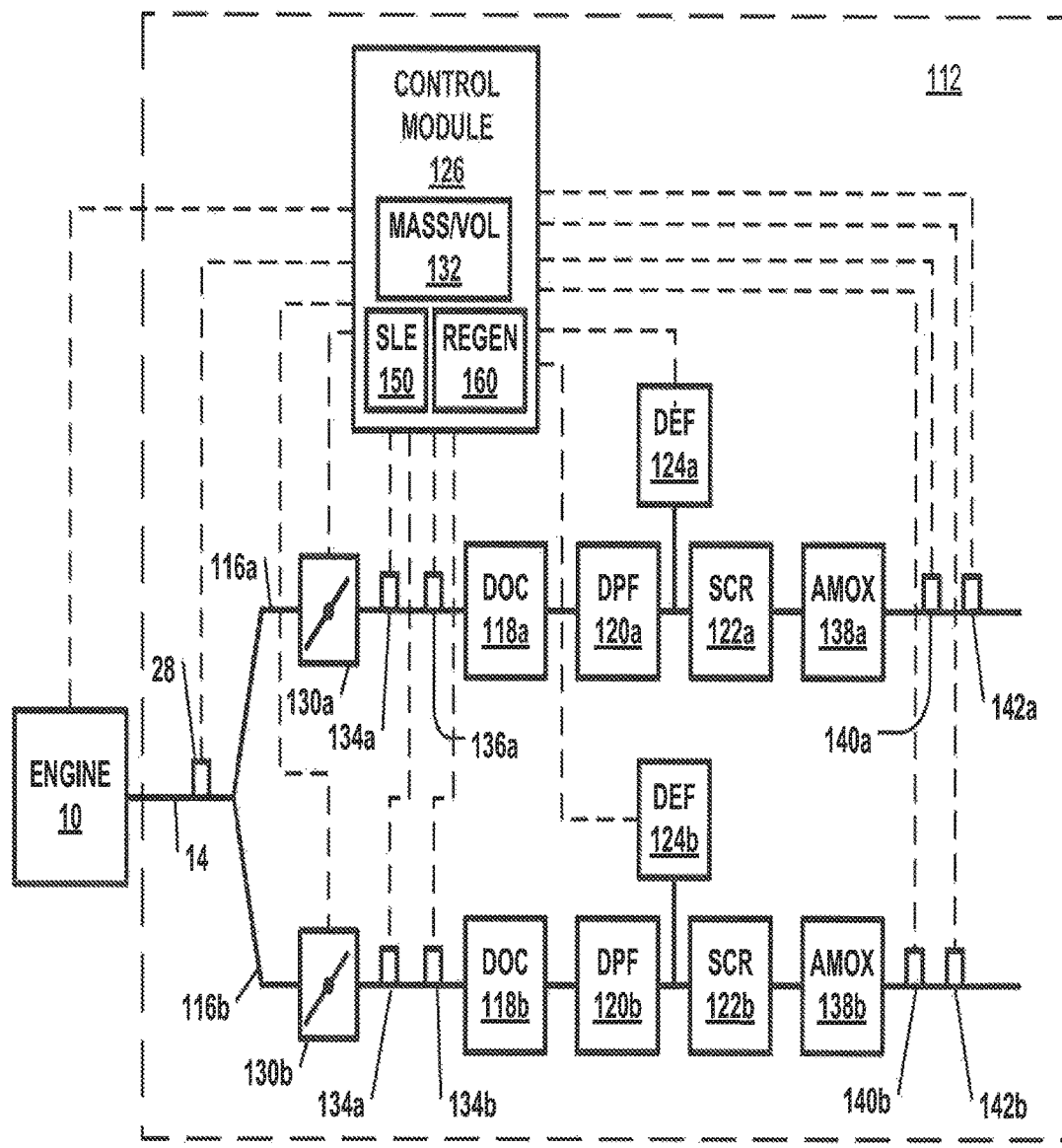
FIG. 3 is a schematic block diagram of a multi-leg after-treatment system according to an exemplary embodiment in which each exhaust leg includes an exhaust flow control valve, a DPF and an SCR.

FIG. 3 shows an exhaust aftertreatment system 112 according to an embodiment. Items of exhaust aftertreatment system 112 having the same numbers as in the exhaust aftertreatment system 12 are described above. Additionally, items of the exhaust aftertreatment system 112 shown in FIG. 3 that are similar to those described above have reference numbers that are 100 more in count than corresponding item reference numbers shown in FIG. 1.

As shown in FIG. 3, the exhaust aftertreatment system 112 is fluidly connected to an internal combustion engine 10 by a main exhaust passage 14 that splits into plural exhaust legs or passages 116a, 116b, although in other embodiments the plural exhaust legs 116a, 116b can fluidly connect to an exhaust manifold of the engine (not shown) without including the main exhaust 14 segment therebetween. Additionally, it is to be understood that an embodiment can include more than the two exhaust legs.

The exhaust aftertreatment system 112 is a DOC/DPF/SCR aftertreatment architecture that processes exhaust from the internal combustion engine 10 using the plural exhaust legs 116a, 116b. More specifically, the exhaust leg 116a includes a DOC 118a, a DPF 120a, an SCR 122b, and a DEF dosing system 124a. Similarly, the exhaust leg 116b includes a DOC 118b, a DPF 120b, an SCR 122b, and a DEF dosing system 124b.

Different DPF designs could be used, including but not limited to wall flow, partial flow, catalyzed, or non-catalyzed. Because the DPFs 120a, 120b trap soot and other PM in the exhaust stream, these particles can accumulate and plug a DPF in a relatively short time. To prevent the exhaust gas passages in the DPFs from becoming constricted or plugged, these filters must be regenerated from time-to-time to burn off or "oxidizes" accumulated PM. With diesel internal combustion engines, exhaust temperatures often are not sufficiently high to burn accumulated PM so regeneration can includes raising the exhaust gas temperature and/or lowering the oxidation temperature to promote oxidation of the PM.

Regeneration of the DPFs 120a, 120b can be accomplished in a passive and/or active mode. For example, a passive regeneration scheme can include adding a catalyst to the DPF to lower oxidation temperature. In an embodiment, a base or precious metal coating can be applied to the filter surface to reduce the ignition temperature required for oxidizing accumulated PM. Additionally, the DOCs 118a, 118b provided upstream of a respective catalyzed DPF 120a, 120b can include a catalyst to promote oxidation of CO and HC emissions, SOF, and NO in the exhaust stream. NO oxidizes to generate $NO_2$, which is a potent oxidizer of PM in the DPFs 120a and 120b downstream of the respective DOCs 118a, 118b. Examples of active regeneration schemes that increase the exhaust gas temperature include injecting fuel into the exhaust stream, engine operation management, applying heat (e.g., resistive coils) to the exhaust stream, a fuel burner, and/or late fuel injection. The oxidizing process in the DOCs 118a, 118b requires accurate control to maintain the mass ratio of NO/PM in engine-out exhaust gas. Active systems can use pulses of diesel fuel late in the combustion cycle to oxidize across the catalyst thereby heating the DPF 120a, 120b and oxidizing trapped PM. However, running the cycle too often while keeping the back pressure in the exhaust system low, can result in excess fuel use. As will be described later in detail, an active regeneration scheme of a DPF includes exhaust valves 130a, 130b that allow for individual control of exhaust gas flow through exhaust legs 116a, 116b of the exhaust aftertreatment system 112.

Each SCR 122a, 122b is positioned downstream of the respective DPF 120a, 120b for removing NOx emissions from the exhaust gas. Respective diesel emissions fluid (DEF) dosing system 124a, 124b is provided upstream the SCR devices 122a, 122b to selectively and controllably provide a dose of a reductant to the exhaust stream in the exhaust legs. Refer to the above embodiment shown in FIG. 1 for a more detailed SCR description.

The exhaust aftertreatment system 112 includes a control module 126, which can be implemented as the control module 26 described above, but the control module is also capable of receiving a signal indicative of the engine-out NOx concentration sensed by NOx sensor 28. The engine-out NOx concentration signal is provided to a soot loading estimator (SLE) module 150, which can be implemented as a module in the control module 126, as shown in FIG. 3. Alternatively, an SLE module can be implemented separate from the control module 126, to estimate soot load in each of the DPFs 120a, 120b.

The SLE module 150 determines soot loading estimates, which can provide an estimate as to when regeneration of a DPF in an exhaust leg should occur. However, soot loading of the DPFs 1120a, 120b of the plural exhaust legs 116a, 116b can vary from leg-to-leg. These leg-to-leg variations occur because soot is loaded as a function of exhaust mass flow or exhaust volume flow, and the exhaust legs 116a, 116b can have different geometry either by design or manufacturing tolerances. Additionally, on the engine 10, bank-to-bank differences can create different input conditions to different exhaust legs. For instance, fuel injector variability on the engine side could drive PM differences between the banks. Thus, knowing the exhaust flow in an exhaust leg and/or the relative flow between exhaust legs in the multi-leg exhaust aftertreatment system 112 can aid the SLE module 150 in estimating with greater accuracy a soot loading of a DPF, and thus when to regenerate that DPF.

As shown in FIG. 3, each leg 116a, 116b of the exhaust aftertreatment system 112 is provided with a respective valve device 130a, 130b, such as an adjustable exhaust throttle. The exhaust valve devices 130a, 130b are positioned in the exhaust leg after the point where the main exhaust passage 14 splits into the plural legs, although the valves 130a, 130b can be positioned anywhere along its respective exhaust leg. The valve devices 130a, 130b are individually controllable to allow for selectively increasing backpressure to the engine 10 for general thermal management. The valve devices 130a, 130b also allow the exhaust stream flow from the main exhaust passage 14 to be split unevenly between the two legs 116a, 116b. Further, the relative exhaust mass flow or volume flow among the legs 116a, 116b can be measured, and the valve devices 130a, 130b can be controlled to correct for a flow imbalance or forcing a flow amount in an exhaust leg or relative flow among plural legs to a target value or ratio.

The control module 126 includes a mass flow or volume flow MASS/VOL module 132, which receives signals from flow (or volume flow) measurement devices 134a, 134b. The flow measurement devices 134a, 134b are positioned in respective legs 116a, 116b and sense an exhaust mass flow or volume flow, or one or more characteristic of the exhaust stream from which the MASS/VOL module 132 can derive the exhaust mass flow or volume flow. The volume flow measurement devices 134a, 134b can be implemented in any of the manners described above and positioned anywhere along a respective leg 116a, 116b. While FIG. 3 depicts mass flow or volume flow measurement devices 134a, 134b positioned in each of the exhaust legs 116a, 116b, if a reliable total mass measurement for the entire engine is available, a mass flow measurement device can be included in only one of the two exhaust legs of the exhaust aftertreatment system 112 because the mass or volume flow through the remaining leg can be computed from these values in a straightforward manner.

The exhaust aftertreatment system 112 can include hydrocarbon dosers 136a, 136b positioned upstream of respective DOCs 118a, 118b in each respective leg 116a, 116b. The hydrocarbon dosers 136a, 136b inject hydrocarbons (e.g., fuel) into exhaust stream in an exhaust leg to controllably increase the temperature of the exhaust in that particular leg. Each exhaust leg 116a, 116b also can have multiple temperature and pressure sensors (not shown), which could be positioned at points upstream and downstream of each element in the leg to monitor temperature and pressure at those points.

After calculating the exhaust flow or imbalance in the legs 116a, 116b, this exhaust flow information can be used in several different ways. For example, the control module 126 can compensate the reductant (e.g., urea) dosing in each leg 116a, 116b to provide a correct amount of reductant. The diagnostics algorithm also can draw conclusions about the health of the system, and can detect whether any of the DPFs 120a and 120b are plugged or damaged. This can be based on knowledge that over the long run, soot loading in each leg 116a, 116b will balance to give very similar flows in each leg. If a significant flow-imbalance is detected, and this imbalance persists over time, it can reliably be concluded that there is a DPF failure. By comparing the pressure drop across a DPF to an expected value, for example, based on a delta-p based soot load estimation provided by the SLE 150, the diagnostics can determine if a failure is related to the DPF being plugged (i.e., pressure drop is higher than anticipated), or whether the DPF is cracked (i.e., pressure drop is lower than anticipated). The flow measurement devices 134a and 134b supply NOx flux information to a reductant dosing algorithm executed by respective DEF dosing systems 124a, 124b, which attempt to deliver a targeted ANR. The flow measurement devices 134a and 134b also can supply exhaust flow input to the soot load estimation algorithm implemented in the SLE 150.

As shown in FIG. 3, an ammonia oxidation (AMOX) catalyst device 138a, 138b can be positioned downstream of a respective SCR 122a, 122b, to reduce ammonia slipping past the SCRs, although an AMOX catalyst is not required in this and other embodiments. Each AMOX catalyst device 138a, 138b can be an integral part of the upstream SCR 122a, 122b in an exhaust leg 116a, 116b, or a separate container connected in the legs 116a, 116b downstream of the SCRs. Downstream of the AMOX is the exhaust stack (not shown). In the exemplary embodiment shown in FIG. 3, a NOx feedback sensor 140a, 140b and a temperature sensor 142a, 142 are placed downstream of the outlets of respective AMOX catalyst devices 138a, 138b. Alternatively, or in combination with the NOx sensors 140a, 140b, a reductant sensor such as an ammonia sensor (not shown) can be positioned after the AMOX to measure a reductant slip concentration exiting the system and provide feedback to the DEF dosing system 224 and control module 126 for appropriate ANR adjustment based on this feedback.

The control module 126 includes a regeneration (REGEN) module 160 that utilizes a soot load estimated by the SLE 150 and individually manages exhaust flow and temperature in each of the two legs 116a, 116b to carry out regeneration of the DPFs in the exhaust leg 116a, 116b. At light loads, it can be advantageous to pass most or all of the exhaust flow through one or more of the exhaust legs, but not through others. For example, the REGEN module 160 can cause one of the two legs 116a, 116b to intentionally have a different flow from the other leg. In some embodiments, for example, the optimal split between the exhaust legs 116a/116b can vary between split ratios of 50/50 to 0/100 to 100/0, depending on the operating condition, although any split ratio can be achieved with an appropriate control of valve devices 130a, 130b. For example, a 0/100 split ratio can be accomplished by closing exhaust valve 130a of leg 116a entirely and leaving exhaust valve 130b of leg 116b open to direct substantially the entire exhaust stream from the engine 10 though the exhaust leg 116b.

The REGEN module 160 can individually control exhaust valves 130a, 130b to provide a minimum amount of exhaust flow required to regenerate the DPF 120a or 120b of an exhaust leg 116a or 116b, and thus provide a way to control and initiate a regeneration event in a particular exhaust leg. In other embodiments, a multi-leg exhaust aftertreatment system consistent with the claimed invention can include more than two exhaust legs, and more than two exhaust valves can be individually controlled to initiate regeneration in one or plural DPFs. Also, regeneration can occur at lower loads by passing more than of the exhaust through one subset of the exhaust legs than through another subset of the exhaust legs, for example, more than half of the exhaust through one of the two exhaust legs 116a, 116b shown in FIG. 3. Additionally, restricting the flow in this manner can controllably increase the backpressure on the engine 10, which increases the load on the engine and thus the exhaust temperature to aid in regeneration. Further, if only one leg is regenerated at a time (for example, at light load), passing most or all of the flow through one exhaust leg controllably increases the rate at which the DPF heats up to allow for faster regeneration at light loads using less hydrocarbon dosing, which provides a increased efficiency with respect to fuel consumption.

The regeneration algorithm of the REGEN module 160 attempts to achieve a target temperature at the outlet of the DOCs 118a, 118b. By adding the ability to adjust the relative flow through the two legs 116a, 116b, the target temperature at the DOC outlet of an exhaust leg that is being regenerated can be adjusted more effectively. At the beginning of a DPF regeneration event, higher exhaust flows tend to increase the rate at which the DPF temperature climbs. Once the temperature in the DPF has reached a level at which oxidation of the particulates is occurring, the trend is reversed, and lower flow rates lead to higher temperatures, as the heat generated by the reaction cannot be carried away as effectively.

In some embodiments, at low system loads, a passive regeneration event can be initiated by channeling most or all of the exhaust flow to an exhaust leg that is to be regenerated. This will increase the exhaust temperature in that exhaust leg due to the higher backpressure. A hydrocarbon source (e.g., fuel) can be injected into the exhaust stream of an exhaust leg via the hydrocarbon dosers 136a, 136b to further increase the exhaust temperature, allowing the oxidation of particulate in the DPF in that exhaust leg to start. Once the temperature in the DPF has reached the ideal range, hydrocarbon dosing is no longer needed and the temperature range can now be adjusted by controlling the exhaust flow through the DPFs 120a, 120b via respective exhaust valves 130a and 130b. Once the regeneration of one exhaust leg has been completed, the system can switch to regenerate another exhaust leg.

In another embodiment, during light loads, the exhaust valve devices 130a, 130b can be adjusted to positions where most of the exhaust flow is passed through more than one leg to increase back pressure, and thus also increase exhaust temperature to permit passive regeneration of the DPFs positioned in those exhaust legs. Moreover, the DPF temperature can increase further because the higher flow rate results in a smaller percentage of heat lost due to convection and radiation. By avoiding or reducing injection of hydrocarbon into the exhaust stream, greater fuel efficiency can be obtained.

As can be seen, dynamically adjusting the split between two or more exhaust legs (e.g., exhaust legs 116a and 116b) can allow for controllable efficient regeneration events. In addition to controlling the relative flow through the two exhaust legs, it is also possible to close both exhaust throttles in such a way to control both the split and the backpressure. This additional control lever can also be used to further optimize a regeneration event.

In a case where excessive DPF temperature exists in one of the exhaust legs, the control module 126 can be configured to control an exhaust flow control device such as exhaust valves 130a or 130b to completely shut off the exhaust flow to the exhaust leg having the DPF over-temperature, which can protect that DPF from damage in such a situation. With shutoff, the flow of oxygen to the DPF is cut off and the particulate oxidation will stop, thus preventing an undesired over-temperature event.

Figure 4:
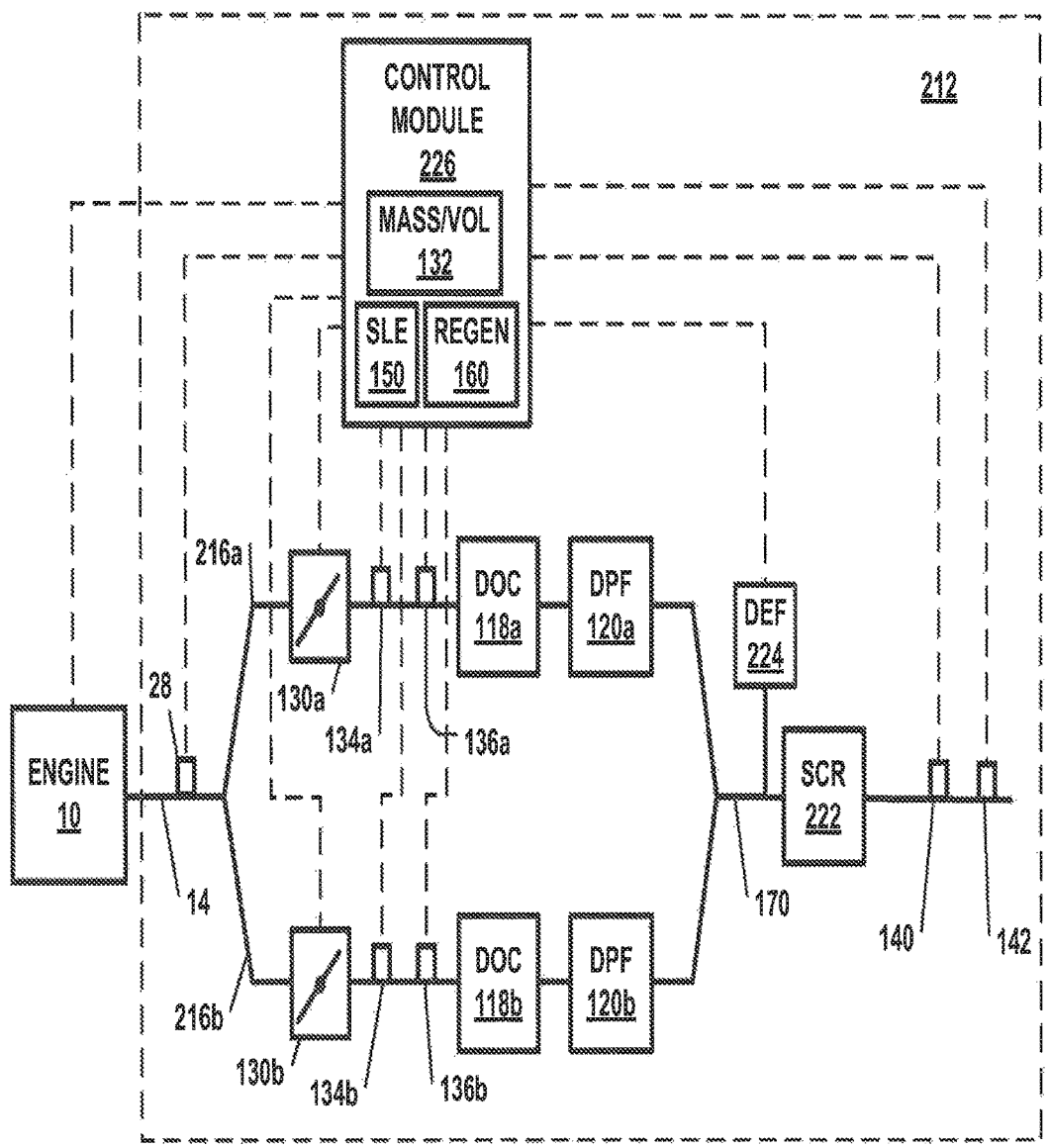
FIG. 4 is a schematic block diagram of a multi-leg after-treatment system according to an exemplary embodiment in which a single SCR is provided downstream exhaust legs, and each exhaust leg includes an exhaust flow control valve, a DOC and a DPF.

FIG. 4 is a diagram of a multi-leg exhaust aftertreatment system 212 according to another exemplary embodiment. The multi-leg aftertreatment system 212 is similar to the exhaust aftertreatment system 112 shown in FIG. 3 in that an exhaust passage 14 from an internal combustion engine 10 is split to form plural legs 216a, 216b, each of which includes an exhaust valve 130a or 130b, a DOC 118a or 118b, and a DPF 120a or 120b, as described above, but the exhaust legs in system 212 are combined into a single exhaust channel 170 downstream the DPFs 120a and 120b. A single SCR 222 and DEF dosing system 224 are positioned along the channel 170. In the multi-leg exhaust aftertreatment system 212, the flow through the DEF dosing system 124 and the SCR 222 can be accurately calculated from the total mass flow through the engine, which allows accurate DEF dosing. Although not shown, the system 212 can include an AMOX catalyst downstream of the SCR 222 to reduce ammonia slip.

Under normal operating conditions, the SCR element 222 is the primary element of the exhaust aftertreatment system for removing NOx from the exhaust gas stream. During normal operating conditions, the control module 226 receives signals from various sensors, such as the throttle sensor and air temperature sensor on the engine (not shown) or a NOx sensor 140 provided after the exit of the SCR 222. From the sensed conditions, the controller 126 can determine various parameter values of engine 10 and the exhaust aftertreatment system 212. More specifically, the controller 226 will control the DEF doser system 224 to inject reductant at a rate needed to operate the SCR 222 for a current operating condition of the engine 10 and in view of any measured or estimated imbalance in exhaust mass flow or volume flow. Alternatively, or in combination with the NOx sensor 140, a reductant sensor 142, such as an ammonia sensor, can be provided to measure the reductant concentration downstream of the SCR 222 and provide feedback to the DEF dosing system 224. Using feedback information from the ammonia sensor 142 and/or the NOx sensor 140, the DEF dosing system 224 can determine an appropriate ANR.

It will be appreciated that the embodiments described and shown herein may be modified in a number of ways. For instance, although the exemplary embodiments described above each include two legs, a multi-leg exhaust aftertreatment system consistent with the claimed invention can include more than two legs, and control of a balance or unbalanced the mass flow and volume flow through each of the legs can be carried out for each exhaust leg. Further, prior to assembly, the mass flow or volume flow through one or more elements constituting a leg can be measured and control to affect differential mass flow or volume flow among the exhaust legs can be carried out based on the measured values.

Although not shown, an exemplary embodiment can include temperature sensors positioned at the entrance and the exit of the SCR in each leg of a multi-leg exhaust aftertreatment system consistent with the claimed invention. By dynamically measuring these temperatures and combining this information with a model of the thermal behavior of the SCR catalyst, it is possible to estimate the relative flow in the different legs.

In another exemplary embodiment, the complete system is modeled and the conversion efficiency of the system is measured at the exit of each exhaust leg. From this information, the relative flow in the different exhaust legs can be estimated.

Additionally, the exhaust aftertreatment system can include other elements such as a NOx adsorber catalyst, or lean NOx trap (LNT) implemented in a separate chambers from the SCR or both the SCR and LNT implemented in a same chamber.

Furthermore, while the exemplary embodiments are sometimes described herein in the context of a diesel internal combustion engine, the same concepts can be applied in a lean burn gas, such as a lean burn gasoline or natural gas, powered internal combustion engine.

Embodiments consistent with the claimed invention facilitate balancing exhaust flow through plural exhaust legs of a multi-leg exhaust aftertreatment system, which can substantially equalize soot loading among the DPFs of the exhaust legs. Additionally, the flow in the exhaust legs can be controlled to actively drive a flow imbalance to compensate for flow differences resulting from manufacturing variability, differences by design and/or performance differences among the exhaust legs and/or to initiate regeneration in a DPF of a leg.

Although a limited number of exemplary embodiments is described herein, one of ordinary skill in the art will readily recognize that there could be variations to any of these embodiments and those variations would be within the scope of the appended claims. Thus, it will be apparent to those skilled in the art that various changes and modifications can be made to the multi-leg exhaust aftertreatment system and method described herein without departing from the scope of the appended claims and their equivalents.

What is claimed is:

1. A method of exhaust aftertreatment for a multi-leg exhaust aftertreatment system, the multi-leg exhaust aftertreatment system including plural parallel exhaust legs adapted to receive exhaust from an internal combustion engine, each of the plural parallel exhaust legs including a diesel oxidation catalyst, a diesel particulate filter, and an independently controllable exhaust valve, the method comprising:

flowing exhaust gas through the plural parallel exhaust legs;

detecting an exhaust mass flow or exhaust volume flow characteristic in at least one of the plural parallel exhaust legs;

determining amounts of exhaust mass flow or exhaust volume flow in the plural parallel exhaust legs based on the detected exhaust mass flow or exhaust volume flow characteristic;

determining soot loading estimates for each diesel particulate filter based on the respective determined amounts of exhaust mass flow or exhaust volume flow; and individually adjusting the exhaust valves in each of the plural parallel exhaust legs based on the determined soot loading estimates for each diesel particulate filter.

2. The method of claim 1, wherein the determined amounts are relative amounts among the plural parallel exhaust legs.

3. The method of claim 1, further comprising:

if the determined soot loading estimate of the diesel articulate filter of one of the plural parallel exhaust legs reaches a predetermined regeneration threshold, controlling the exhaust valves to force a greater amount of the exhaust flow through the exhaust leg having the diesel particulate filter exceeding the predetermined regeneration threshold than the other exhaust leg to maintain a target regeneration temperature at an inlet of the diesel particulate matter filter of that exhaust leg.

4. The method of claim 3, further comprising dynamically controlling the exhaust valves to maintain the temperature at an inlet of the exhaust leg being regenerated above the target regeneration temperature.

5. The method of claim 1, further comprising controlling the exhaust valves based on engine load to maintain a temperature in each exhaust leg at or above a target minimum temperature.

6. The method of claim 1, wherein the multi-leg exhaust aftertreatment system includes a selective catalytic reducer downstream of the plural parallel exhaust legs.

7. The method of claim 1, wherein the multi-leg exhaust aftertreatment system includes a flow sensor comprising one of a delta-P device, a hot-film device, a vortex shedding device, and an ultrasonic device.

8. The method of claim 1, wherein the exhaust mass flow or exhaust volume flow characteristic is a concentration of ammonia in the exhaust flowing through the at least one of the plural parallel exhaust legs.

* * * * *